US010773986B2

(12) United States Patent
Biagini et al.

(10) Patent No.: US 10,773,986 B2
(45) Date of Patent: Sep. 15, 2020

(54) SYSTEM AND PROCESS FOR TREATING PRODUCED AND FRAC FLOWBACK WATERS

(71) Applicant: Veolia Water Solutions & Technologies Support, Saint-Maurice (FR)

(72) Inventors: Brad Biagini, Beaver, PA (US); Charles Blumenschein, Pittsburgh, PA (US); Caroline Dale, Fleurie (FR); Hillary Kronebusch, Pittsburgh, PA (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 0 days.

(21) Appl. No.: 16/476,142

(22) PCT Filed: Jan. 10, 2018

(86) PCT No.: PCT/US2018/013094
§ 371 (c)(1),
(2) Date: Jul. 5, 2019

(87) PCT Pub. No.: WO2018/132426
PCT Pub. Date: Jul. 19, 2018

(65) Prior Publication Data
US 2019/0352206 A1  Nov. 21, 2019

Related U.S. Application Data

(60) Provisional application No. 62/444,975, filed on Jan. 11, 2017.

(51) Int. Cl.
C02F 1/00 (2006.01)
C02F 1/04 (2006.01)
(Continued)

(52) U.S. Cl.
CPC ............... *C02F 9/00* (2013.01); *C02F 1/048* (2013.01); *C02F 1/20* (2013.01); *C02F 1/32* (2013.01);
(Continued)

(58) Field of Classification Search
None
See application file for complete search history.

(56) References Cited

U.S. PATENT DOCUMENTS

8,734,650 B2  5/2014 Bradley
9,580,343 B2  2/2017 Keister
(Continued)

*Primary Examiner* — Bradley R Spies
(74) *Attorney, Agent, or Firm* — Coats and Bennett PLLC (57) ABSTRACT

A method of treating produced water, such as frac flowback, that includes pre-treating the produced water which is followed by a crystallization process that produces a condensate that typically includes ammonia and benzene. The ammonia and benzene concentration is reduced by biologically nitrifying and denitrifying the condensate. This produces an effluent that is directed to a solids-liquid separation process that removes suspended solids. The solids-liquid separation process produces another effluent that is subjected to a benzene polishing process that further reduces the benzene concentration of the effluent produced by the solids-liquid separation process.

17 Claims, 3 Drawing Sheets

(51) Int. Cl.
- *C02F 1/20* (2006.01)
- *C02F 1/56* (2006.01)
- *C02F 1/66* (2006.01)
- *C02F 1/72* (2006.01)
- *C02F 101/00* (2006.01)
- *C02F 101/16* (2006.01)
- *C02F 101/32* (2006.01)
- *C02F 103/10* (2006.01)
- *C02F 3/30* (2006.01)
- *C02F 5/02* (2006.01)
- *C02F 9/00* (2006.01)
- C02F 1/32 (2006.01)
- C02F 1/40 (2006.01)
- C02F 1/52 (2006.01)
- C02F 101/20 (2006.01)

(52) U.S. Cl.
CPC .............. *C02F 1/40* (2013.01); *C02F 1/5245* (2013.01); *C02F 1/56* (2013.01); *C02F 1/66* (2013.01); *C02F 1/722* (2013.01); *C02F 3/302* (2013.01); *C02F 5/02* (2013.01); *C02F 2001/007* (2013.01); *C02F 2001/5218* (2013.01); *C02F 2101/006* (2013.01); *C02F 2101/16* (2013.01); *C02F 2101/203* (2013.01); *C02F 2101/322* (2013.01); *C02F 2103/10* (2013.01); *C02F 2305/12* (2013.01)

(56) References Cited

U.S. PATENT DOCUMENTS

| | | | |
|---|---|---|---|
| 2013/0264280 A1* | 10/2013 | Zhao | C02F 3/348 210/605 |
| 2013/0313199 A1 | 11/2013 | Marcin et al. | |
| 2013/0313201 A1* | 11/2013 | Blumenschein | C02F 5/02 210/713 |
| 2015/0345278 A1* | 12/2015 | Schooley | B01D 9/0059 166/267 |

* cited by examiner

SYSTEM AND PROCESS FOR TREATING PRODUCED AND FRAC FLOWBACK WATERS

RELATED APPLICATIONS

The present application is a U.S. National Stage Application of PCT Application No. PCT/US2018/013094, with an international filing date of Jan. 10, 2019. Applicant claims priority based on U.S. patent application Ser. No. 62/444, 975 filed Jan. 11, 2017. The subject matter of these application is incorporated herein their entirety.

FIELD OF THE INVENTION

The present invention relates to gas recovery systems and processes, and more particularly to systems and processes for treating produced water and frac flowback water generated in oil and gas recovery processes.

BACKGROUND OF THE INVENTION

Natural gas is sometimes buried below the earth's surface in shale reservoirs. To recover this gas, the shale reservoirs are hydraulically fractured. Large volumes of frac fluid or gel are used to create a path for the gas to flow to the surface. Often shale reservoirs are associated with ground water. When the gas flows to the surface for recovery, the ground water and the water in the frac fluid flows to the surface as well. The recovered ground water and the water used to frac the shale reservoir, along with oil in some cases, are separated from the natural gas. Water separated from the natural gas is referred to as produced water.

The number of hydraulic fracturing shale gas wells in the United States and worldwide continues to increase. The United States has vast reservoirs of oil and natural gas which are commercially reachable as a result of hydraulic fracturing technologies. But as more hydraulic fracturing wells come into operation, so does the stress on surface water and ground water supplies from the withdrawal of large volumes of water used in the process. In some cases, for example, as much as one million gallons of fresh water per well head is required to complete the fracking process.

Equally important is the growing volume of wastewater generated from fracking wells which require disposal, recycling or treatment. In some cases, as much as 60% of the water injected into a well head during the fracking process will be discharged back out of the well shortly thereafter as frac flowback. Produced water is often contaminated with concentrations of constituents that require treatment before it can be reused or discharged to the environment. These contaminants typically include hydrocarbons from oil and inorganic salts. In particular, the contaminants in produced water typically include suspended solids, dissolved solids such as calcium, magnesium, sodium, barium, strontium, iron, chloride, etc.

There are three main approaches to dealing with wastewater in the oil and gas industry. The first, and by far the most common, is collecting the wastewater in large tanks and shipping it for disposal in underground injection wells. The second approach is treating the produced water, either onsite or at a centralized facility. This is particularly challenging since treatment standards are generally stringent and the cost is in some cases prohibitive. The third approach is to treat the produced water to lesser degrees and reuse it for fracturing fluid.

Considering the amount of water used or consumed in fracking operations and the need to conserve water resources, there is a need for produced water treatment processes that can meet stringent discharge requirement faced today and at the same time are cost effective.

SUMMARY OF THE INVENTION

The present invention relates to a system and process for treating produced water generated in a gas or oil recovery process. The system comprises: (1) a produced water pre-treatment system; (2) a system for thermally evaporating and concentrating the pre-treated produced water; and (3) a system for further treating the produced water downstream of the system for thermally evaporating and concentrating the produced water.

In one embodiment, the produced water contains naturally occurring radioactive materials (NORM) (such as radium) hardness and barium. The pre-treatment process is strategically designed to minimize the production of sludge that contains NORM. To accomplish this, the pre-treatment process entails mixing a sulfate source with the produced water which results in the precipitation of barium sulfate, NORM and the production of a barium sulfate sludge that contains the NORM. The barium sulfate sludge, including the NORM, is removed from the produced water. Thereafter, hardness is precipitated and a hardness sludge is produced, which is removed from the produced water. In one particular case, the hardness of concern is magnesium and it is precipitated by raising the pH of the produced water to approximately 10.8-11.3. By strategically precipitating the barium sulfate and the NORM upstream of the hardness removal process, the amount of sludge produced by the process that contains NORM is minimized. After removing barium sulfate, NORM and hardness, the produced water is subjected to a crystallization process that produces a concentrate and an effluent. In some cases, the effluent produced pursuant to the crystallization process will include an ammonia and/or benzene concentrations that prevent the effluent from the crystallization process to be discharged. As an option, the process may entail a biological nitrification and denitrification process for reducing the ammonia and/or benzene concentration. In addition, as a further option, the process may entail a solids-liquid separation process downstream of the biological nitrification and denitrification process. As a further option, the process may include a benzene polishing process for further reducing the concentration of benzene.

In one embodiment, after pre-treatment, the produced water is subjected to a crystallization process that produces a distillate that, in some cases, cannot be discharged to the environment. For example, in some cases the distillate includes concentrations of ammonia and benzene that exceed acceptable discharge limits. By biologically treating the distillate, both the concentration of ammonia and benzene is reduced. Thereafter, suspended solids or particulates in the effluent from the biological process are removed by the solids-liquid separation process. Finally and in the way of an example, an advanced oxidation process utilizing UV light is employed to further reduce the benzene concentration.

In one embodiment, the present invention entails a method of treating produced water. This is achieved by first pre-treating the produced water to remove suspended solids and selected ions. After pre-treating the produced water, the method entails directing the produced water to a crystallizer and concentrating the produced water in the crystallizer. In this process, the crystallizer produces a concentrate and steam. The steam condenses to form a first effluent that contains ammonia and benzene. The method entails reducing the concentration of both ammonia and benzene by biologically treating the first effluent in a nitrifying and denitrifying process. The biological treatment produces a second effluent that includes suspended solids. The method entails subjecting the second effluent to a solids-liquid separation process and removing suspended solids from the second effluent. In the process, the solids-liquid separation process produces a third effluent that includes residual benzene. The method then includes a polishing process for further reducing the concentration of benzene. In one exemplary process, the concentration of residual benzene is reduced in an advanced oxidation process that employs hydrogen peroxide and ultraviolet light to oxidize benzene to carbon dioxide and water.

Other objects and advantages of the present invention will become apparent and obvious from a study of the following description and the accompanying drawings which are merely illustrative of such invention.

EXEMPLARY EMBODIMENTS OF THE PRESENT INVENTION

The present invention relates to a system and process for treating hydrofracking wastewater. For convenience, the term "produced water" is used to describe hydrofracking wastewater. As used herein, the term "produced water" is a term used in the oil industry to describe water that is produced as a by-product along with oil or gas. In particular, the term "produced water" also means any form of hydrofracking wastewater including, for example, frac flowback.

Figure 1:
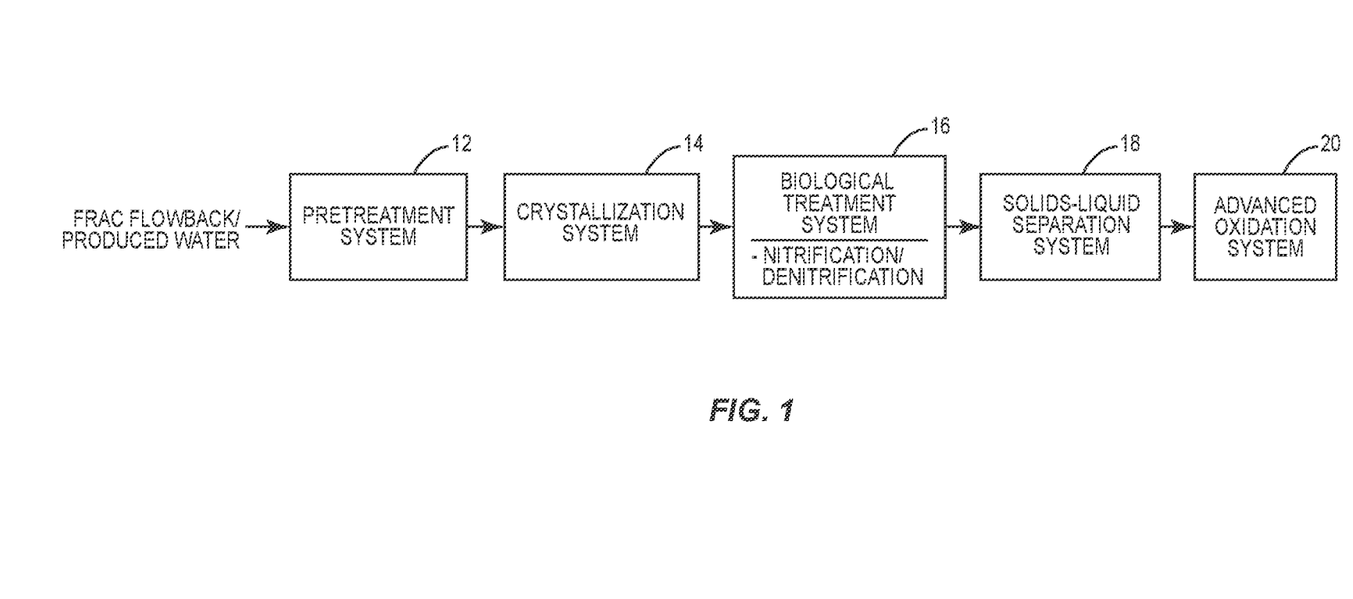
FIG. 1 is a high level schematic drawing showing the basic system and process for treating produced water from a hydrofracking operation.

As shown in FIG. 1, the system and process for treating produced water includes a pre-treatment system 12 that is followed by a crystallization system 14. Thereafter, there is provided a biological treatment system 16 for nitrifying and denitrifying the produced water. Biological treatment system 16 produces an effluent that is further treated in a solids-liquid separation system 18. The solids-liquid separation system 18 also produces an effluent and this effluent is treated in an advanced oxidation system or polishing unit 20. In the case of one embodiment discussed, the advanced oxidation system 20 is designed to reduce the concentration of residual benzene in the effluent from the solids-liquid separation system 18.

Produced water, especially produced water from a fracking operation typically includes many contaminants. To name a few, produced waters may include calcium, magnesium, sodium, barium, strontium, radium and other naturally occurring radioactive materials (NORM), bicarbonate, ammonia and benzene. Many of these contaminants are problematic and difficult to remove, especially to levels required by applicable regulations. For example, in systems and processes that are practical and cost effective, it is often challenging to reduce the concentration of ammonia and benzene down to typical permit limits.

It may be beneficial to first briefly review the systems referred to above and shown in FIG. 1. The pre-treatment system 12 is designed to remove grit, total suspended solids (TSS), and free oil and grease. In addition, the pre-treatment system is designed to remove many dissolved solids, including barium, strontium, radium and NORM, iron and magnesium, for example. These are exemplary contaminants and depending on the makeup of the produced water being treated, the pre-treatment system 12 may be designed to remove other contaminants. Subsequently herein, typical processes for pre-treating produced water will be described.

After pre-treatment, the produced water is directed to the crystallization system 14. In one embodiment, the crystallization system 14 comprises a thermal evaporation system which produces a condensate and a concentrate. As will be discussed later, in one embodiment, the produced water is de-aerated prior to reaching the crystallization system 14. In some applications, the condensate includes contaminants that exceed typical permit limits. In one particular case, the condensate produced by the crystallization system 14 includes ammonia and benzene concentrations that exceed typical permit limits. In addition, the vent condensate from the upstream de-aerator may be likewise contaminated. Thus, the condensate from the crystallization system 14 and the vent condensate can be blended and subjected to further treatment.

Ammonia and benzene concentrations are addressed by the biological treatment system 16. In one embodiment, the biological treatment system 16 comprises a moving bed bioreactor (MBBR). See FIG. 2. The MBBR is employed to perform nitrification and denitrification processes that reduces the ammonia concentration and the benzene concentration in the blended condensates produced by the crystallization system 14 and the de-aerator.

The MBBR unit produces an effluent that now has suspended solids that typically exceed permit limits. To deal with this, the present process employs the solids-liquid separation system 18. Here the solids-liquid separation system 18 removes suspended solids from the effluent produced by the biological treatment system 16.

In some cases, there will still be contaminants in the effluent produced by the solids-liquid separation system that require further reduction. One example is a case where the benzene concentration in the effluent from the solids-liquid separation system still exceeds permit limits. To address this, the present process employs a benzene polishing process which, in one example, is an "advanced oxidation process". The advanced oxidation process employs an ultraviolet (UV) light reactor to emit high energy UV radiation into the effluent from the solids-liquid separation system 18. Hydrogen peroxide is injected into the feed to the advanced oxidation system. The hydrogen peroxide reacts with UV light to create hydroxyl radicals which then rapidly react with benzene, oxidizing it to carbon dioxide and water. Sodium bisulfate can be injected into the effluent from the advanced oxidation system to quench any residual hydrogen peroxide. At the end, carbon dioxide and a caustic can be added for final pH adjustment if such is deemed necessary.

What has just been discussed is an overview of the systems and processes used to treat produced water from a hydrofracking operation. What follows is a slightly more in depth discussion of the systems and processes just described. See, for example, FIG. 2. Those skilled in the art understand and appreciate that systems and processes for treating produced water can vary, depending on specific applications and the makeup of the produced water being treated. Thus, the systems and processes discussed below are exemplary processes.

Figure 2:
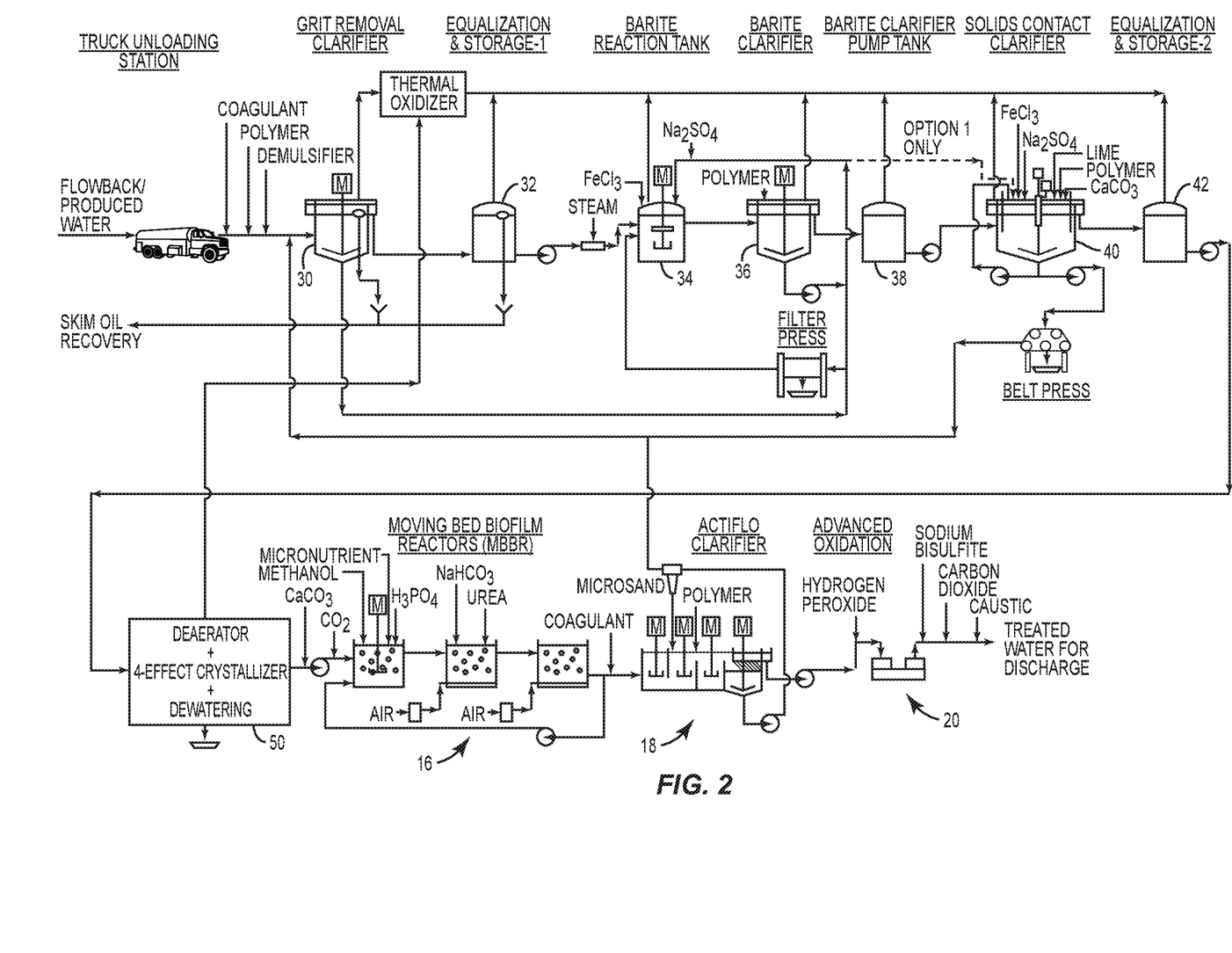
FIG. 2 is a schematic illustration showing an exemplary process for treating produced water from a hydrofracking operation.

With reference to FIG. 2, produced water is directed to a grit clarifier 30 for the removal of suspended solids and free oil. Prior to clarification, a coagulant and a flocculant can be mixed with the produced water. Further, an oxidant and a de-emulsifier can be mixed with the produced water via static mixers. A portion of the suspended solids in the produced water are settled in the grit clarifier 30. These settled suspended solids can be directed to a sludge holding tank and ultimately to a de-watering device such as a belt press, or the suspended solids can be sent directly to a de-watering device. Provided in the grit clarifier 30 is an oil skimmer. The oil skimmer skims oil from the surface of the produced water in the grit clarifier 30 and the skimmed oil is pumped to an oil collection tank. In a preferred embodiment, the grit clarifier 30 is covered and gas-blanketed with off-gas being routed to a thermal oxidizer.

Based on particle size distribution (PSD) results and subsequent Stokes' Law calculations, it is estimated that, in one example, an average of 30% (by mass) of the influent total suspended solids (TSS) will be settled and removed in the grit clarifier 30. These solids can be pumped to a sludge holding tank at an estimated concentration of 2.5 wt % where they can be combined with the sludge that is generated in the downstream selective ion removal process before being fed to the belt presses. The solids removed in the grit removal clarifier 30 accounts for about 4% of the total dry mass of solids that will need to be dewatered along with the selective ion removal solids in the belt filter presses. Water will overflow from the clarifier 30 into a small clarifier pump tank before being pumped to a larger equalization tank 32.

Clarified effluent from the grit clarifier 30 is pumped to the equalization tank 32. Equalization tank 32 also includes an oil skimmer that skims oil from the surface of the produced water and directs the skimmed oil to the oil collection tank.

Produced water is pumped from the equalization tank 32 to a barite reaction tank 34 that includes an internal mixer. A coagulant ($FeCl_3$) and sodium sulfate, as well as recycled barite solids, are mixed with the produced water in the barite reaction tank 34. This facilitates the precipitation of barium sulfate (barite). In addition, a portion of the strontium in the produced water can also precipitate in the barium reaction tank 34 as strontium sulfate. Also, there may be some precipitation of radium and other NORM in the barite reaction tank.

Barite reaction tank 34, in a preferred embodiment, includes a draft tube mixer, such as the Turbomix draft tube mixer marketed by Veolia Water Technologies, Inc.. Again, one of the purposes of the barite reaction tank is to remove barium to a pre-treatment target (in one example) of less than 10 mg/L as a pre-treatment for the downstream crystallizer or crystallizers. As noted in the drawings, a coagulant, sodium sulfate and recycled barite solids are added to the barite reaction tank 34 in order to facilitate the precipitation of barium sulfate. Radium in the produced water will precipitate along with the barium and strontium sulfate solids. The total suspended solids formed in this process can, in certain situations, be as much as 1500 mg/L. This depends, of course, on the average influent water quality conditions, as well as the influent flow.

Produced water and the solids generated in the barite reaction tank 34 are pumped to a barite clarifier 36. Both barite and strontium sulfate solids have relatively high specific gravities, 4.5 and 4.0 respectively, and therefore will settle rapidly. Solids precipitated in the barite reaction tank 34 are allowed to settle in the barite clarifier 36. As noted above, a portion of the settled solids will be recycled to the barite reaction tank 34 to enhance the reaction growth kinetics of the barite crystals and the remaining solids will be purged and pumped to a barite sludge holding tank (not shown). Effluent from the barite clarifier 34 will overflow by gravity to a barite clarifier pump tank 38 before being pumped downstream to a solids contact clarifier 40. It should be noted that preferably the barite reaction tank, barite clarifier and barite clarifier pump tank are covered and gas-blanketed with all off-gases being routed to the thermal oxidizer.

The purpose of the solids contact clarifier 40 is to remove selected ions and more particularly to reduce the concentration of iron, magnesium, TSS and any remaining free oil in the produced water before the produced water reaches the crystallization system 14. In one embodiment, solids contact clarifier 40 provides coagulation, chemical precipitation, flocculation and clarification with sludge recirculation in a single vessel. Produced water is pumped from the barite clarifier pump tank 38 into the center well of the solids contact clarifier 40 where chemicals are added into a continuous mixed zone. A coagulant, such as ferric chloride, is added and mixed with the produced water. Hydrated lime can be added to provide hydroxide alkalinity to assist in the precipitation of magnesium as magnesium hydroxide. This increases the pH, in one embodiment, to approximately 10.8 in order to sufficiently reduce the magnesium concentration in the produced water. Recycled sludge is added into the center well of the solids contact clarifier 40 to provide a seed crystal for the fresh precipitate. In this particular example, one may expect the TSS formed in the process to mainly consist of magnesium hydroxide with smaller amounts of calcium carbonate and ferric hydroxide precipitates, as well as small concentrations of oil that will adsorb onto the precipitated solids. A portion of the settled solids are recycled from the bottom of the solids contact clarifier 40 to the mixing zone therein to improve performance and to reduce chemical requirements. Excess solids are removed from the clarifier 40 and pumped to a sludge holding tank. Clarified effluent from the solids contact clarifier 40 will overflow into a clarifier effluent tank 42.

Sludge produced by the grit clarifier 30 and the solids contact clarifier 40 are pumped to a sludge holding tank. From the sludge holding tank, sludge is directed to a selected de-watering system. Filtrate produced by the de-watering system is recycled back to the grit clarifier 30. Concentrated de-watered cake produced by the de-watering system can be transported to a landfill for disposal.

From the clarifier effluent tank 42, the pre-treated produced water is directed to a section of the overall system where the produced water is de-aerated and subjected to thermal evaporation. In FIG. 2, this is represented by block 50 which includes a de-aerator, crystallizer and a de-watering unit. In this regard, the produced water is first directed downwardly through the de-aerator. Steam is injected upwardly through the de-aerator and moves counter to the flow of the produced water. This removes air and other non-condensable gases from the produced water. Vapor is vented from the de-aerator and may include volatile compounds, such as ammonia, and volatile organics, such as benzene. Vapor vented from the de-aerator condenses and this is referred to as vent condensate.

After the produced water has been de-aerated, it is directed to the crystallization system 14 (see FIG. 1) which in the end produces a concentrate and steam that condenses to form a condensate. Various thermal evaporation/crystallization systems can be used to further purify the produced water resulting from pre-treatment. For example, a multi-effect forced circulation crystallizer can be employed. In one example, the crystallizer system is a thermal process that includes a steam driven four-effect crystallizer train that utilizes a low temperature process and a deep vacuum. This crystallization process combines a chilled water system and a conventional forced circulation crystallizer train to take advantage of the reduced solubility and boiling point rise of highly soluble salts, such as calcium chloride, at low temperature. Direct crystallization of calcium chloride and other highly soluble salts using this low temperature deep vacuum four-effect crystallization process may eliminate the need for full softening (which is an expensive pre-treatment) and can produce a crystalline solid or mixed salt that can be landfilled. In the end, the crystallization system 14 produces a condensate that is still produced water, albeit a highly treated form of produced water. Yet in many applications, the condensate from the crystallization system 14 and the vent condensate are sufficiently contaminated such that the condensates cannot be safely discharged. The contaminants that prevent safe discharge may vary from application to application. In one embodiment, the produced water may have a relatively high concentration of ammonia and benzene and the concentration of these two contaminants may still be present in the condensate to the extent that the produced water should be further treated.

To address the ammonia and benzene concentrations, the present process provides the optional biological treatment system 16 downstream of the crystallization system 14 where the specific aim of the biological treatment system is to reduce the ammonia concentration, as well as reduce the benzene concentration in the influent to the biological treatment system. Carbon dioxide ($CO_2$) is injected into the influent to the biological treatment system 16 in order to adjust the pH down. In one embodiment, it is contemplated that the pH may be reduced to approximately 7.0 to approximately 8.0. Carbon dioxide will provide a portion of the alkalinity that may be required for the biological process. Various biological treatment systems can be utilized. One example is the MBBR discussed above and which provides both denitrification and nitrification, as well as partial benzene removal. The MBBR process is a fixed film biological process that does not require control sludge wasting or sludge recycling. As illustrated in FIG. 2, in this example the MBBR process includes three zones, a first denitrification zone operated under anoxic conditions and two downstream nitrification zones operated under oxic or aerobic conditions to nitrify the water passing through the zones. A portion of the effluent from the last nitrification zone is recycled to the denitrification zone. This MBBR nitrification/denitrification process, illustrated in FIG. 2, is effective to reduce the ammonia concentration and at the same time reduce the benzene concentration of the produced water.

Because the biological system 16 produces biomass, it follows that the effluent from the biological system includes suspended solids and, in many cases, the concentration of suspended solids exceeds applicable permit limits. To address this, the solids-liquid separation system 18 is placed downstream of the biological treatment system 16. Various solids-liquid separation systems can be employed. In the exemplary embodiment shown in FIG. 2, a ballasted flocculation system is employed. For example, an appropriate ballasted flocculation system is the "Actiflo" system marketed by Veolia Water Technologies, Inc. In any event, in a typical ballasted flocculation system, a coagulant, a polymer, and microsand is mixed with the water to be treated. With the aid of the coagulant and flocculant, the microsand forms ballasted floc that effectively removes suspended solids.

At this point in the process, the ammonia concentration has been reduced to acceptable permit limits. However, it is possible that, even after the biological treatment, the benzene concentration may still exceed applicable permit limits. To address this, the system and process shown in FIG. 2 provides the advanced oxidation system 20 discussed above. The advanced oxidation system is designed for benzene destruction. The advanced oxidation system employs an ultraviolet (UV) light reactor to emit high energy UV radiation into the produced water. Hydrogen peroxide is injected into the feed to the advanced oxidation system 20. Hydrogen peroxide reacts with UV light to create hydroxyl radicals which then react with benzene, oxidizing it to carbon dioxide and water. Sodium bisulfate can be injected into the treated effluent of the advanced oxidation system to quench any residual hydrogen peroxide. Carbon dioxide and a caustic can also be added for final pH adjustment if necessary.

This treatment process is an exemplary embodiment and is deemed to be capable of reducing the total ammonia concentration to less than 36 mg/L as N. With respect to benzene, it is hypothesized that the process will reduce benzene concentration to less than four parts per billion.

As noted above, the produced water may contain radium which is a naturally occurring radioactive material (NORM). One aspect of the technical problem addressed is that of finding a practical and efficient way of removing radium and NORM from the produced water. Produced water treatment processes can produce relatively large amounts of sludge. To address this technical problem, the processes described herein are designed to minimize the sludge produced by the various processes that contain radium and other NORM. In addressing this problem, the processes described herein strategically position and place the sludge producing processes such that sludge containing the radium and NORM is minimized and segregated from other sludge produced in the process. In the case of the process depicted in FIG. 2, the radium and other NORM are removed in the barite reaction tank 34 and the barite clarifier 36 upstream of where the hardness sludge is produced by the solids contact clarifier 40. Because the amount of sludge produced by the barite clarifier 36 is relatively small compared to the overall sludge produced by the process, the amount of sludge containing the radium and NORM is minimized.

Figure 3:
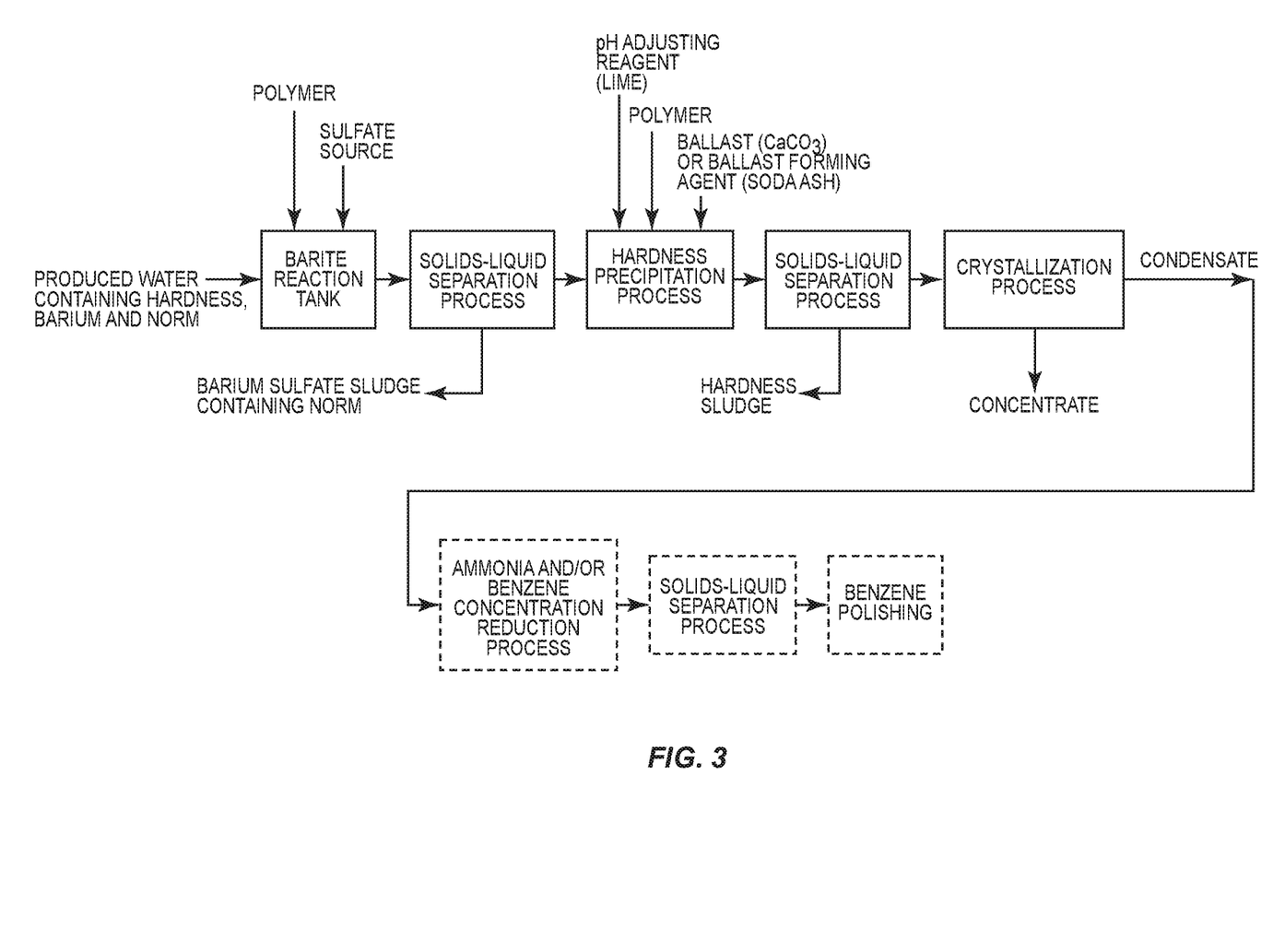
FIG. 3 is another embodiment of a produced water process.

FIG. 3 shows another embodiment of the present invention. FIG. 3 depicts a produced water process that treats the produced water and minimizes the sludge produced which contains the radium and NORM. In particular, in the case of the FIG. 3 process, the produced water contains hardness and, in this example, magnesium forms a significant part of the hardness. In addition, the produced water contains barium and NORM such as radium.

The process addresses the NORM before hardness is addressed. As seen in FIG. 3, a sulfate source, such as sodium sulfate, is mixed with the produced water along with a coagulant and/or a flocculant. This causes barium sulfate to precipitate. Barium sulfate will, in turn, adsorb radium and other NORM. Once the barium sulfate has been precipitated and the NORM has been adsorbed onto the barium sulfate, then the produced water can be subjected to a solids-liquid separation process which produces a sludge containing the barium sulfate and the adsorbed NORM.

After the solids-liquid separation process, the produced water is directed to a section of the process that addresses hardness. In this example, the focus of the hardness reduction is on magnesium. It is understood and appreciated that in some produced water processes, the hardness of main concern might be calcium or other divalent cations. In any event, the process described herein focuses on the efficient removal of hardness, and in particular, magnesium. To achieve this, a ballasted flocculation process is employed, which is designed to expedite and facilitate the settling of magnesium hydroxide. First, to precipitate magnesium hydroxide, a pH adjusting reagent, such as lime, is mixed with the produced water. The objective here is to raise the pH of the produced water to approximately 10.8-11.3. This will cause magnesium hydroxide to precipitate. To facilitate the separation of the magnesium hydroxide from the produced water, a coagulant and/or a flocculant is mixed with the produced water and, as an option, a ballast is injected or formed in the produced water. In one embodiment, calcium carbonate is injected and mixed with the produced water and acts as a ballast to facilitate the settling of the precipitated magnesium hydroxide. In other cases, the ballast is formed by adding soda ash or sodium carbonate. This reacts with the lime to form calcium carbonate that functions as a ballast to facilitate the settling of the magnesium hydroxide.

The settling of the ballast and magnesium hydroxide solids forms what is referred to as a hardness sludge. This hardness sludge generally is substantially larger than the barite sulfate sludge. Since the radium and NORM are removed with the barium sulfate sludge, it follows that there is little, if any, radium or NORM to contaminate the hardness sludge. Thus, the strategic use of the barite reaction tank 34 and the barite clarifier 36 enables the sludge containing the radium and NORM to be minimized.

Continuing to refer to FIG. 3, after the hardness is removed from the produced water, the produced water is directed to a crystallizer or crystallization process which produces a concentrate and a condensate. In some cases, the condensate will include concentrations of ammonia and/or benzene that preclude discharge to the environment. In these cases, the processes discussed above can be strategically used to reduce the ammonia concentration and/or the benzene concentration. That is, the process disclosed in FIG. 3 can optionally utilize biological nitrification and denitrification to reduce the concentration of ammonia and benzene, the solids-liquid separation process discussed above to remove suspended solids or the advanced oxidation process as a benzene polishing process or any combination of the three processes shown downstream of the crystallization process shown in FIG. 3.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of treating produced water containing suspended solids, oil, barium, iron, magnesium, ammonia and benzene, the method comprising:
   pre-treating the produced water including:
   i. directing the produced water into a grit clarifier and removing at least some of the suspended solids and oil from the produced water;
   ii. after subjecting the produced water to treatment in the grit clarifier, directing the produced water into a barite reaction tank;
   iii. mixing a sulfate source with the produced water in the barite reaction tank and precipitating solids including barium sulfate;
   iv. directing the produced water from the barite reaction tank to a barite clarifier and settling the solids, including the barium sulfate;
   v. recycling at least a portion of the settled solids from the barite clarifier to the barite reaction tank and mixing the settled solids with the produced water and sulfate source in the barite reaction tank;
   vi. directing the produced water downstream from the barite clarifier to a solids contact reactor and mixing one or more reagents, including a coagulant, with the produced water in the solids contact reactor and precipitating iron and magnesium;
   vii. settling the precipitated iron and magnesium in the solids contact reactor;
   viii. removing the settled iron and magnesium precipitates from the produced water;
   after pre-treating the produced water, directing the produced water to a deaerator and de-aerating the produced water;
   after de-aerating the produced water, directing the produced water to a crystallizer and concentrating the produced water in the crystallizer to produce a concentrate and steam that condenses to form a first effluent that contains at least some of the ammonia and benzene;
   reducing the ammonia and benzene concentration in the first effluent by biologically nitrifying and denitrifying the first effluent;
   wherein biologically nitrifying and denitrifying the first effluent produces a second effluent;
   subjecting the second effluent to a solids-liquid separation process and removing suspended solids from the second effluent and in the process producing a third effluent; and
   subjecting the third effluent to a benzene polishing process and further reducing the benzene concentration of the third effluent.

2. The method of claim 1 wherein the de-aerator produces a vent stream that contains at least some of the benzene and the method includes blending the vent stream with the first effluent prior to the first effluent being biologically treated to reduce the concentration of ammonia and benzene.

3. The method of claim 1 including reducing the concentration of ammonia and benzene in the first effluent by biologically nitrifying and denitrifying the first effluent in a moving bed bioreactor (MBBR).

4. The method of claim 1 wherein subjecting the third effluent to a benzene polishing process comprises:
   emitting ultraviolet (UV) light into the third effluent;
   injecting hydrogen peroxide into the third effluent and reacting the hydrogen peroxide with the UV light to yield hydroxyl radicals, which in turn react with benzene to oxidize the benzene to carbon dioxide and water.

5. The method of claim 1 wherein the produced water also includes strontium and the method includes precipitating strontium sulfate in the barite reaction tank.

6. The method of claim 1 including increasing the pH of the produced water in the solids contact clarifier by mixing a pH adjusting reagent with the produced water in the solids contact clarifier and increasing the pH of the produced water in the solids contact clarifier to approximately 10.8.

7. The method of claim 1 further including mixing hydrated lime with the produced water in the solids contact clarifier to facilitate the precipitation of magnesium hydroxide and to increase the pH of the produced water.

8. The method of claim 1 including removing air and other non-condensable gases from the produced water by directing the produced water downwardly through the de-aerator and at the time injecting steam into the de-aerator and wherein the steam contacts the produced water passing through the de-aerator and the method yields a vapor that is vented from the de-aerator and wherein the vapor includes at least some of the benzene.

9. The method of claim 1 including adding alkalinity to the first effluent produced by the crystallizer in order to facilitate the biological nitrification and denitrification process by injecting carbon dioxide into the first effluent.

10. A method of treating produced water containing suspended solids, barium and hardness, comprising:
pre-treating the produced water comprising:
  i. removing the barium from the produced water prior to removing the hardness by mixing a sulfate source with the produced water and precipitating barium sulfate;
  ii. removing the precipitated barium sulfate from the produced water;
  iii. after removing the precipitated barium sulfate from the produced water, raising the pH of the produced water and precipitating hardness;
  iv. removing the precipitated hardness from the produced water;
after pre-treating the produced water, directing the produced water to a crystallizer and concentrating the produced water in the crystallizer to produce a concentrate and steam that condenses to form a first effluent that contains ammonia and benzene;
reducing the ammonia and benzene concentration in the first effluent by biologically nitrifying and denitrifying the first effluent;
wherein biologically nitrifying and denitrifying the first effluent produces a second effluent;
subjecting the second effluent to a solids-liquid separation process and removing suspended solids from the second effluent and in the process producing a third effluent; and
subjecting the third effluent to a benzene polishing process and further reducing the benzene concentration of the third effluent.

11. The method of claim 10 further including de-aerating the produced water after pre-treatment and wherein de-aerating the produced water produces a vent condensate that also includes ammonia and benzene.

12. The method of claim 11 including blending the vent condensate with the first effluent and biologically nitrifying and denitrifying the vent condensate.

13. The method of claim 10 wherein the method produces a barium sulfate sludge and a hardness sludge, and wherein the produced water includes naturally occurring radioactive material that is adsorbed onto the precipitated barium sulfate and thereby forms a part of the barium sulfate sludge which tends to minimize the sludge produced which contains the naturally occurring radioactive material.

14. The method of claim 10 wherein, after removing the precipitated barium sulfate, the method entails forming a ballast in the produced water wherein the ballast comprises calcium carbonate.

15. A method of treating produced water containing suspended solids, barium, magnesium and ammonia, comprising:
pre-treating the produced water by:
  i. mixing a sulfate source with the produced water in a barite reaction tank and precipitating barium sulfate;
  ii. removing the barium sulfate from the produced water;
  iii. after removing the barium sulfate from the produced water, directing the produced water downstream to a ballasted flocculation reactor;
  iv. mixing a pH adjusting reagent with the produced water and increasing the pH of the produced water and causing magnesium hydroxide to precipitate in the ballasted flocculation reactor;
  v. injecting a ballast into the ballasted flocculation reactor or injecting a reagent into the ballasted flocculation reactor that forms a ballast, and mixing the ballast with the produced water which in turn facilitates the settling of the precipitated magnesium hydroxide;
  vi. removing the ballast and precipitated magnesium hydroxide from the produced water;
after removing the magnesium hydroxide and ballast from the produced water, directing the produced water to a crystallizer and concentrating the produced water in the crystallizer to produce a concentrate and a condensate which forms a first effluent and contains at least some of the ammonia; and
reducing the ammonia concentration in the first effluent by biologically nitrifying and denitrifying the first effluent.

16. The method of claim 15 wherein the first effluent also includes benzene and wherein biologically nitrifying and denitrifying the first effluent reduces the concentration of the benzene in the first effluent and produces a second effluent; and wherein the method further includes subjecting the second effluent to a solids-liquid separation process and removing suspended solids from the second effluent and in the process producing a third effluent; and subjecting the third effluent to a benzene polishing process and further reducing the benzene concentration of the third effluent.

17. The method of claim 15 wherein the produced water further includes naturally occurring radioactive material and the method minimizes the production of sludge containing the naturally occurring radioactive material by adsorbing the naturally occurring radioactive material onto the precipitated barium sulfate and removing the precipitated barium sulfate with the adsorbed naturally occurring radioactive material upstream of the process where magnesium hydroxide is removed from the produced water.

\* \* \* \* \*